Sept. 22, 1970 W. K. HODDER 3,530,256

INFORMATION RECORDING AND REPRODUCTION APPARATUS WITH SIGNAL DISPERSION AND RESTORATION FILTERS

Filed June 2, 1967 3 Sheets-Sheet 1

WAYNE K. HODDER
INVENTOR.

BY.

ATTORNEY.

WAYNE K. HODDER
INVENTOR.

BY

ATTORNEY.

INVENTOR.
WAYNE K. HODDER

United States Patent Office 3,530,256

Patented Sept. 22, 1970

3,530,256

INFORMATION RECORDING AND REPRODUCTION APPARATUS WITH SIGNAL DISPERSION AND RESTORATION FILTERS

Wayne Kassell Hodder, Glendore, Calif., assignor to Bell & Howell Company, Chicago, Ill., a corporation of Illinois Filed June 2, 1967, Ser. No. 643,119
Int. Cl. G11b 5/02
U.S. Cl. 179—100.2 10 Claims

ABSTRACT OF THE DISCLOSURE

Apparatus for recording and reproducing time-varying electric information signals having means for recording information corresponding to elemental fractions of the electric information signals on extended sections of a recording medium, and means for converting information recorded on extended sections of the recording medium into elemental fractions of reproduced information signals, whereby the energy of momentary error signals is dispersed relative to the elemental fractions of the reproduced information signals.

CROSS-REFERENCE TO RELATED APPLICATIONS

Applicant has no related applications as of the filing date of the subject application.

BACKGROUND OF THE INVENTION

Field of the invention

The subject invention relates to the recording and reproduction of information and, more particularly, to apparatus for producing a record of electric information signals and for reproducing electric information signals from this record, thereby suppressing or materially reducing impulse-like or momentary disturbances.

Description of the prior art

The art of recording and reproducing electric information signals has made tremendous progress in recent years. However, there still exists a need for economical equipment which effects a suppression or material reduction of impulse-like or momentary disturbances without requiring extensive modifications of the basic recording equipment.

Throughout the years, certain types of recording equipment have become established and are favored because of their efficiency, relative simplicity and reliability. An example which readily comes to mind is the familiar type of magnetic recording equipment in which information presented in the form of electric signals is recorded by means of at least one magnetic recording head on moving magnetic tape and is reproduced therefrom with the aid of one or more playbacks heads, as the case may be. Functionally analogous recording apparatus have also been developed and are well known in the art.

The performance of these types of recording equipment is frequently impaired by impulse-like or other momentary disturbances which frequently recur, mostly in random fashion. One source of disturbances of this type are imperfections in the recording medium. Another disturbance is known to come about from momentary random imperfections in the recording or the playback process. Switching transients provide further momentary disturbances. For instance, in magnetic recording tape apparatus, impulse-like error signals are produced by tape blemishes, by undesirable momentary head-to-tape separations caused by tape asperities, and also by switching transients if multiple-head arrangements are employed.

It has long been recognized that impulse-like error signals or noises are among the most objectionable forms of interference in the reproduction of recorded information. For example, if the information is of the audible type, this kind of interference can be very annoying and tiresome to the listener and can in advanced stages virtually obliterate parts of the information. These problems are further compounded if the information is in the form of video signals, since impulse noise is particularly annoying if presented in visible form. Also, the familiar synchronization components of video equipment are by their nature sensitive to pulsed information and are easily misguided by spurious pulses. Similar problems are present with data processing equipment which relies in its operation on the evaluation of recorded pulses, or instrumentation equipment which has to conform to very stringent standards of performance.

While these problems have been recognized for a long time, they have not so far found an economic solution in the sense mentioned above in the information recording and reproduction art. Rather, efforts have been directed to reduce the influence of pulse noise in data transmission links or systems (see Wainwright, On the Potential Advantage of a "Smearing, Desmearing" Filter Technique in Overcoming Impulse Noise Problems in Data Systems, 6th National Communications Symposium (1960), pp. 233–41; and Gibson, A Highly Versatile Corrector of Distortion and Impulse Noise, Proc. of the National Electronics Conference (1961), pp. 543–56), and in radar installations.

The subject invention provides novel apparatus which may include conventional recording and playback equipment but in which impulse-like disturbances are suppressed or at least reduced to tolerable minima.

From one aspect thereof, the apparatus of the subject invention includes input means for receiving time-varying electric information signals, a recording medium, and output means for reproduced electric information signals. According to the invention, this apparatus further includes means connected to the named input means and adapted to be operatively coupled to the recording medium for converting the received electric information signals into information which is recordable on the recording medium and for recording information corresponding to elemental fractions of the mentioned received signals on extended sections or portions of the recording medium so that different elemental areas of the recording medium contain superimposed information corresponding to different elemental fractions of the received signals. In this manner, elemental fractions of the information signal are not recorded as points on the recording medium, but are spread over extended sections of the medium.

This apparatus moreover includes means connected to the named output and adapted to be operatively coupled to the recording medium for reproducing, from information recorded on the medium, electric signals which include elemental fractions that correspond to information recorded on extended sections of the recording medium, applying these reproduced signals to the named output means, and diffusing at the same time the energy of spurious signals of momentary duration. In this fashion, information recorded on extended sections of the recording medium is reconstructed into elemental fractions which make up information signals. Conversely, error signals of localized origin or momentary nature are spread over extended periods of time, or in other words, are diffused in their energy.

The above mentioned presence of superimposed information corresponding to different elemental fractions of the received signals on different points of the recording medium is an important feature of the subject invention. This is best apparent if an arbitrary point or elemental area of the recording medium is considered and if it is assumed, by way of example, that elemental fractions of, say, three time points of a received information signal are recorded on this elemental area.

A momentary error signal occurring in coincidence with the elemental area just mentioned will naturally affect all of the three elemental fractions of the information signal. This will disperse the energy of this error signal over three elemental fractions of the information signal when this information signal is reproduced during playback. Instead of a strong error signal affecting one elemental fraction of the reproduced information signal, there occur only weak errors coinciding, in the subject example, with elemental fractions of three time points of the reproduced information signal. This reduces otherwise objectionable error signals to tolerable levels or eliminates these errors for all practical purposes.

If the recording medium is a magnetic recording tape, the above mentioned means connected to the input means may include means for converting received information signals into magnetically recordable information and for recording magnetically recordable information corresponding to different elemental fractions of the received signals on lineally extended portions of the magnetic recording tape so that elemental areas of the tape contain superimposed information corresponding to different elemental areas of the received signals.

The above mentioned means connected to the output means may then include means for reproducing, from information recorded on the recording tape, electric information signals including elemental fractions corresponding to information recorded on lineally extended portions of the tape, and electric error signals having extended time regions corresponding to spurious information of momentary duration. In this manner, the energy and thus the effect of error signals of localized origin or momentary nature are again diffused.

In a preferred embodiment, the mentioned means connected to the input means include means for dispersing bits or quanta of information contained in different elemental fractions of the received information signal over extended periods of time. Filter means imposing time delays on bits or quanta of information contained in different elemental fractions of the received information signals may be employed for this purpose. These filter means may be constructed to impose different time delays as a function of the frequency of the mentioned bits or quanta of information. The filter means preferably have a constant amplitude versus frequency response over a predetermined bandwidth of frequencies, such as the bandwidth of the particular recording medium, so as to preclude undesirable signal distortions.

In the preferred embodiment just described, the above mentioned means connected to the named output means include for converting bits or quanta of information occurring over extended periods of time into bits or quanta of information forming elemental fractions of a reproduced signal, and for diffusing the energy of bits or quanta of spurious information over relatively extended periods of time. These latter means may include filter means for reducing the duration of bits or quanta of information signals occurring over extended periods of time, and imposing time delays on the mentioned bits or quanta of spurious information.

Another preferred embodiment of the invention presents apparatus for reproducing time-varying electric information signals from an information record located on a recording medium and including spurious information bits or quanta of momentary duration. This apparatus includes means adapted to be operated coupled to the recording medium for converting the recorded information into corresponding time-varying electric information signals and converting the spurious information bits or quanta into corresponding spurious electric information bits or quanta.

According to the invention, the apparatus mentioned in the preceding paragraph is characterized by means for reducing the elemental time duration of the mentioned time-varying electric information signals and extending the time duration of the named spurious information bits or quanta. In this manner, the intensity of the genuine electric information signals is increased with respect to their recorded intensity, while the intensity of the spurious signals is relatively decreased, since their energy is dispersed over extended periods of time or, in other words, is dispersed relative to the genuine information signals.

The apparatus just described may, in accordance with a further embodiment of the invention, be supplemented by means connected to input means for receiving time-varying information signals and constructed for converting these received information signals into signals in which elemental fractions of the received information signals have relatively extended time duration, and by means which are connected to the converting means just mentitoned and which are adapted to be operatively coupled to the recording medium for recording the defined corresponding signals thereon.

BRIEF DESCRIPTION OF THE DRAWINGS

The invention will become further apparent from the following detailed description of preferred embodiments thereof, illustrated by way of example in the accompanying drawings, in which.

DESCRIPTION OF PREFERRED EMBODIMENT

Figure 1:
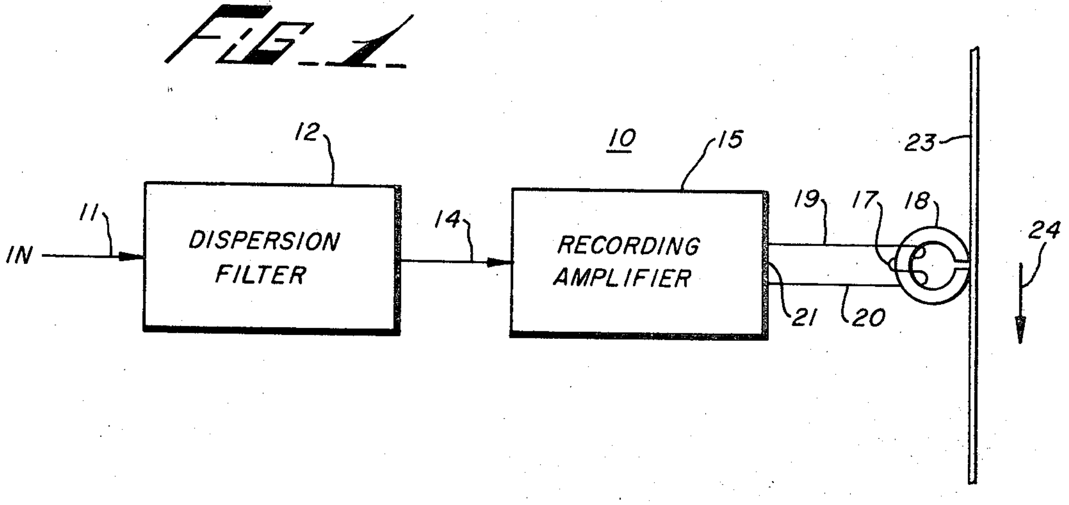
FIG. 1 is a block diagram of a recording apparatus according to an embodiment of the invention.

The recording apparatus 10 shown in FIG. 1 includes input means 11 for receiving a time-varying electric information signal. This signal may, for instance, be an electric signal representing data in, for example, analog, digital or pulsed form, an electric signal representing sound, such as speech or music, for information or entertainment, or an electric video signal with or without synchronization information, or another recordable electric signal.

The input means 11 are connected to a dispersion filter 12 which converts the information signal received at the input means 11, hereinafter referred to as first information signal, into a corresponding or second electric information signal applied to a line 14.

As is the case with time-varying electric signals, the first information signal can be considered as being broken down into time points or elemental fractions that represent bits or quanta of the first information signal. The dispersion filter 12 is effective to disperse these elemental fractions, bits or quanta over periods of time that are extended relative to the original duration of these elemental fractions in the mentioned first signal. The result is a production of the mentioned second information signal in which time points of the first signal are present in an extended or dispersed fashion, whereby elemental fractions or bits of the second information signal contain information corresponding to different elemental fractions or bits of the first information signal.

The line 14 is connected to a recording amplifier 15 which may be of a conventional design employed in the recording of electric information signals, and which has the required bandwidth for the amplification of the defined second signal provided by the dispersion filter 12.

The amplified second signal is applied to a coil 17 of a conventional magnetic recording head 18, by a pair of leads 19 and 20 which are connected to the output 21 of the recording amplifier 15. In the usual manner, the recording head 18 converts its input signal, here the amplified second signal, into corresponding magnetic pulsations which are recorded on a conventional magnetic recording tape 23 that is moved by a conventional drive (not shown) in the direction of arrow 24, and that has the magnetic head 18 operatively coupled thereto. To simplify the drawing, collateral features, such as high frequency energization of the tape, have not been shown.

One result of this recording operation is that elemental fractions, bits or quanta of the first information signal are recorded on extended sections of the tape 23, rather than being recorded on points or elemental regions thereof. To use descriptive language, this may be referred to as "defocusing" or "smearing" of the first information signal. Points or elemental areas of the tape 23 then contain superimposed recorded information pertaining to different elemental fractions, bits or quanta of the first information signal.

Figure 2:
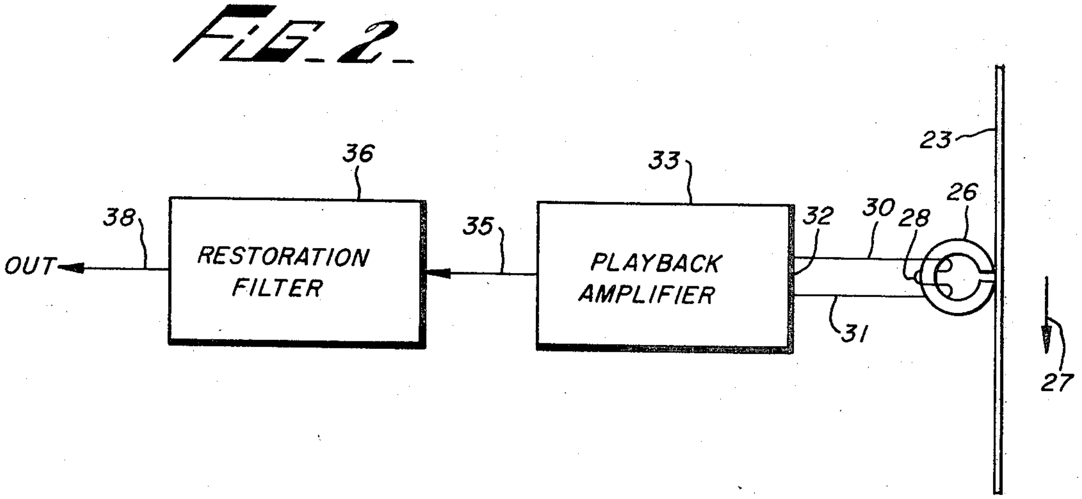
FIG. 2 is a block diagram of a playback apparatus according to an embodiment of the invention.

The apparatus shown in FIG. 2 may be employed to play back the information stored on the tape 23 and to reproduce the above mentioned first information signal.

To this effect, the tape 23 is moved, by a drive (not shown), past a magnetic playback head 26 in the direction of arrow 27. With the aid of a coil 28, the playback head 26 converts the information recorded on the tape 23 into a corresponding information signal, hereinafter referred to as the third information signal.

This third information signal, which is applied to leads 30 and 31, may, and in practice as a rule will, contain error signals of momentary duration or pulse-like noise.

These error signals may be of various origin. For example, they may be due to blemishes on the tape 23, such as imperfections in the magnetizable coating of the tape produced during manufacture, use or handling of the tape. Momentary head-to-tape separations, such as separations caused by tape asperities, may also be responsible for pulse-like error signals. In many modern applications, multiple recording and playback heads are used, as is for instance the case in many well-known video tape recording machines. Switching transients occur frequently in these types of recording machines, since the different heads are sequentially switched into circuit. These transients introduce undesirable spikes which are reflected in the played-back information signal.

The leads 30 and 31 are connected to the input 32 of a conventional playback amplifier 33 which, in a customary fashion, amplifies not only the actual information contained in the above mentioned third signal, but also the mentioned error signals.

These error signals are very undesirable for the reasons mentioned initially. Accordingly, the line 35 which conducts the amplified third information signal is connected to what is styled here as a restoration filter 36. In a sense, this filter has the inverse function of the dispersion filter 12. For the purpose of analysis, its function may be described as composed of two simultaneously performed roles.

First, the restoration filter 36 restores the above mentioned first signal by reducing the duration of extended information quanta contained in the amplified third signal so that the previously mentioned elemental fractions, bits or quanta of the first signal are reconstructed.

Secondly, the restoration filter 36 extends the duration of momentary error signals or pulse-like noise contained in the amplified third signal.

The result is a signal which corresponds closely to the signal applied at input means 11 in FIG. 1 and in which the energy of momentary error signals is dispersed.

For practical purposes, this amounts to a suppression of the noise here under consideration, at least down to tolerable levels.

The resulting signal provided by the operation of the restoration filter 36 is applied to an output line 38, which may be connected to further data processing equipment (not shown), such as a loudspeaker arrangement, video display apparatus or data indicating equipment, as the case may be.

It will now be recognized that the invention provides for a suppression or material reduction of serious kinds of noise or signal errors without encumbering the recording and playback processes as such. This is as important as the noise suppression feature itself, since, in ordinary applications, such feature could become largely illusory if it would have to be bought at the price of complex recording and playback operations and apparatus that deviates materially from the apparatus that have become accepted and favored in practice.

Figure 3:
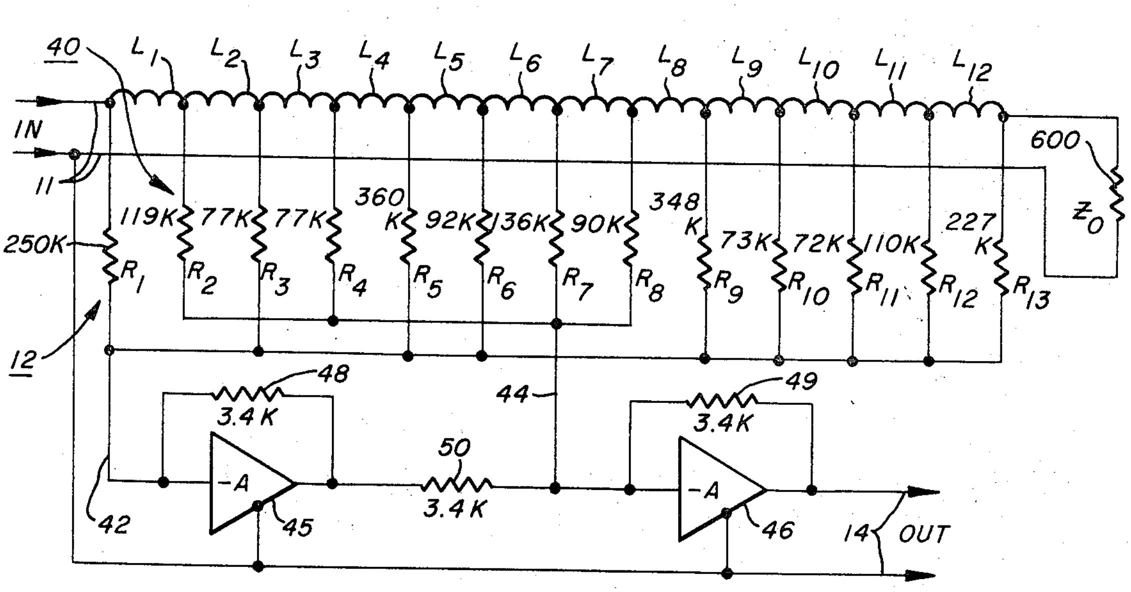
FIG. 3 is a schematic of a filter circuit that may be employed in the apparatus of FIG. 1.

The filter circuit shown in FIG. 3 may be used as the dispersion filter 12 in the apparatus of FIG. 1. This filter circuit includes a 600 ohm, 100 $\mu$'s delay line 40 which includes a termination resistor $Z_0$ and is composed of sections $L_1$ through $L_{12}$ and resistors $R_1$ through $R_{13}$. These components are interconnected and are connected to the above mentioned input leads 11 as illustrated. It will be particularly noted that the resistors $R_1$, $R_3$, $R_5$, $R_6$ and $R_9$ through $R_{13}$ are connected to a common lead 42, while the resistors $R_2$, $R_4$, $R_7$ and $R_8$ are connected to a common lead 44.

The signals occurring at the lead 42 are processed by an inverting feedback amplifier 45 in a manner well known per se, while the signals thus processed, as well as the signals occurring at the lead 44 are processed by a second inverting feedback amplifier 46. The output of the second amplifier 46 is connected to the leads 14 already discussed in connection with FIG. 1.

This kind of signal delay and processing produces the signal dispersion effects described above with respect to the filter 12 of FIG. 1.

By way of example, the values of the various resistors, including the feedback resistors 48 and 49, and the coupling resistor 50 between the amplifiers 45 and 46, have been indicated in FIG. 3. These are the values which were used in a prototype of the apparatus of FIG. 1, that was designed to handle signals which extend in the 250 kHz. range and which are to be magnetically recorded by an instrumentation recorder.

The delay line 40 was obtained from AD–YU Electronics, Inc., Passaic, N.J., while the operational amplifiers 45 and 46 may also be of a conventional design.

Figure 4:
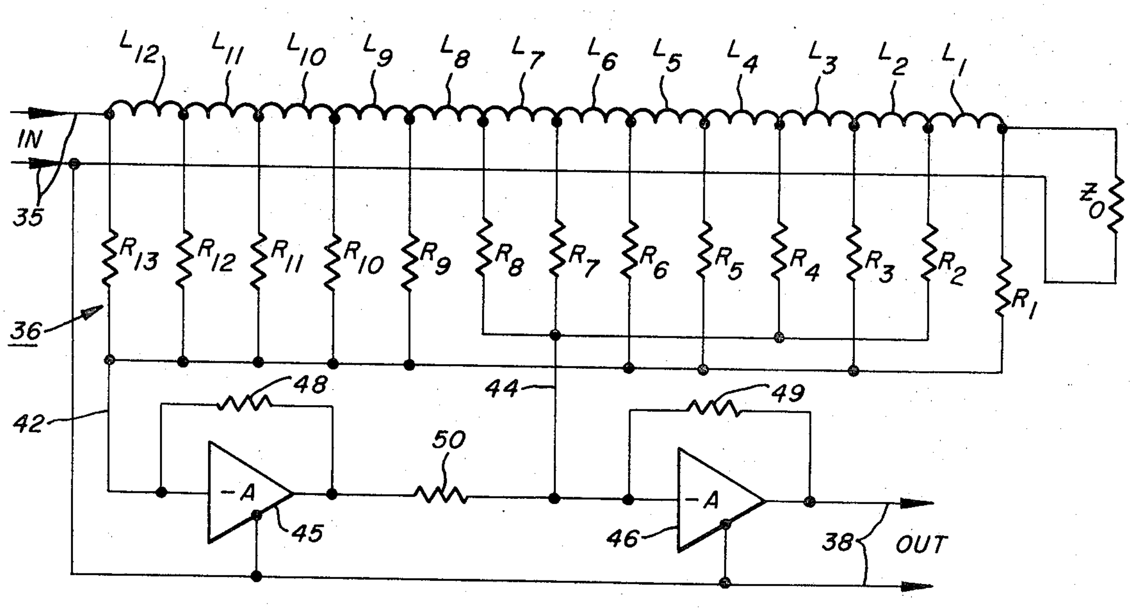
FIG. 4 is a schematic of a filter circuit that may be employed in the apparatus of FIG. 2.

The filter circuit shown in FIG. 4 may be used as the restoration filter 36 in the apparatus of FIG. 2. This restoration filter is similar in composition and arrangement to the dispersion filter 12 of FIG. 1. It will be noted from a comparison of FIGS. 3 and 4 that the sequence of the resistors $R_1$ through $R_{13}$ of FIG. 4 proceeds, with respect to the above mentioned leads 35, in a reverse order relative to the resistors $R_1$ through $R_{13}$ of FIG. 3. The components of the filter circuit of FIG. 4 may, however, be of the same nature and have the same values as the components of the filter circuit of FIG. 3, as is indicated by the use of like reference numerals.

The filter circuit 36 of FIG. 4 then provides the above mentioned signal restoration and error signal dispersion.

Figure 6:
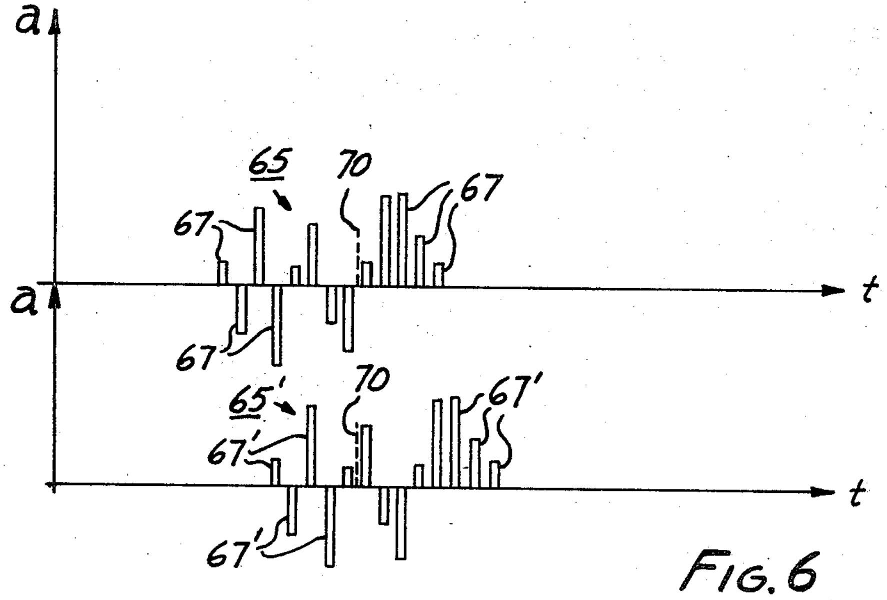
FIG. 6 is a combination of two amplitude-versus-time plots depicting output signals of the dispersion filter of FIG. 3 and also input signals for the restoration filter of FIG. 4.
Figure 7:
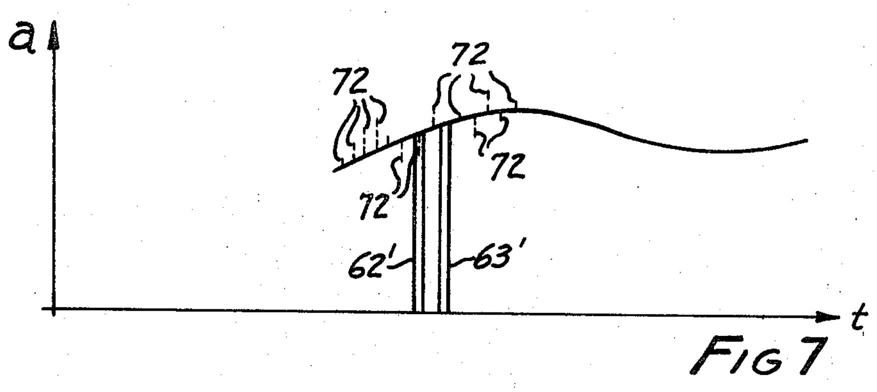
FIG. 7 is an amplitude-versus-time plot depicting an output signal of the restoration filter of FIG. 4.

The information given so far, and particularly the detailed illustrations of FIGS. 3 and 4, will enable persons of average skill in the filter art to understand the functions and build the circuits of operable dispersion and restoration filters. To permit an accelerated review of the disclosure, FIGS. 5 to 7 illustrating typical wave shapes have, however, been added.

Figure 5:
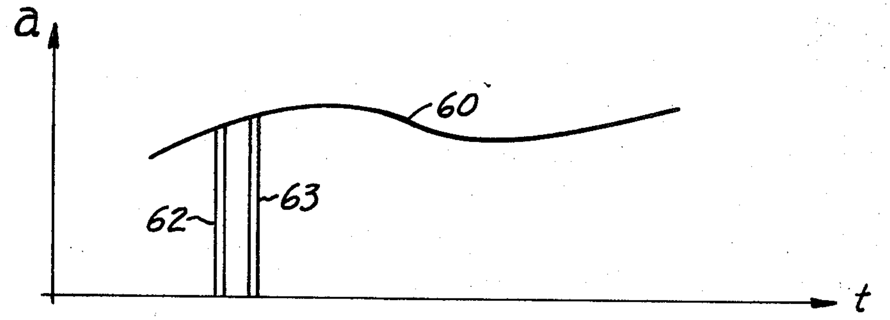
FIG. 5 is amplitude-versus-time plot depicting an input signal for the dispersion filter of FIG. 3.

According to FIG. 5, an input signal 60 may be considered to be composed of elemental fractions two of which are indicated at 62 and 63. When signal 60 is applied to the input lead 11 of the filter 12 of FIG. 3, the elemental fraction 62 is dispersed by the filter 12 into a pattern 65 which appears at the output terminal 14 of such filter, and which is illustrated in the upper part of FIG. 6.

While specific examples have been described and illustrated herein, various modifications within the scope and spirit of the subject invention will be apparent to, or will be within the reach of the applied knowledge and learning of, those skilled in the art.

More specifically, the elemental fraction 62 travels along the delay line $L_1$ through $L_{12}$ of FIG. 3 and is during such travel successively branched off through the resistors $R_1$ through $R_{13}$. The signals which are branched off through the resistors $R_1$, $R_3$, $R_5$, $R_6$, and $R_9$, through $R_{13}$, are applied to the amplifier 45 and are thereupon processed by both the amplifiers 45 and 46. If these amplifiers are both inverters, signals processed in the manner just described are not inverted relative to the input signal at terminals 11.

On the other hand, the signals which are branched off through the resistors $R_2$, $R_4$, $R_7$, and $R_8$ are applied to and processed through the second amplifier 46, but not through the first amplifier 45. This results in an inversion of these branched-off signals relative to the input signal at terminals 11. This, of course, explains why the constituents 67 of the pattern 65 have both positive and negative values, which considerably improves the frequency response of the system over comparable equipment in which all constituents have the same polarity.

The relative amplitude values of the pattern constituents 67 have been adjusted by the selection of the resistor values indicated in FIG. 3 and, together with the illustrated polarities, make for an improved frequency response.

The elemental fraction 63 shown in FIG. 5 is processed by the filter 12 of FIG. 3 in the same manner as the previously applied fraction 62 and the resulting dispersion pattern 65′, with its constituents 67′, corresponds to the pattern 65 having the constituents 67.

While for the purpose of clarity of illustration the dispersion patterns 65 and 65′ have been shown mutually separated in FIG. 6, it should of course, be understood that part of the pattern 65′ as recorded on the tape 23 is superimposed on part of the recorded pattern 65.

This further illustrates key definitions herein employed according to which elemental fraction 62, 63, of input signals 60 are recorded on extended sections of the recording medium (the space occupied by the patterns 65 and 65′ is longer than the space which would be occupied by the elemental fractions 62 and 63 if the same were recorded in undispersed form) so that different elemental areas of the recording medium (namely the areas occupied by overlapping portions of the patterns 65 and 65′) contain superimposed information (superimposed patterns 65 and 65′) corresponding to different elemental fractions 62 and 63 of the input signal 60. Moreover more than two signal patterns may, of course, be superimposed on the tape when more than two elemental signal fractions are dispersed in rapid sequence.

A pair of dotted lines 70 in FIG. 6 indicates an impulse-like disturbance in the signal record presented by the pattern 65 and 65′. The lines 70 may either stand for an error or noise signal spike or for a fallout in an information signal caused, for instance, by an imperfection of the recording tape.

Upon playback, the original patterns 65 and 65′ and the disturbance 70 are picked up by the playback 26, are amplified at 33, and are applied to the input 35 of the restoration filter 36 (see FIGS. 2 and 4). The played-back patterns 65 and 65′ travel along the delay line $L_{12}$ through $L_1$ of the filter 36 shown in FIG. 4, and are branched off by the resistors $R_{13}$ through $R_1$, to be either inverted or non-inverted, depending on whether the particular resistor is connected only to the amplifier 46 or to both the amplifiers 45 and 46 in series. Since the filter

36 of FIG. 4 as mentioned above is the inverse of the dispersion filter 12 of FIG. 3, it will in effect convert the patterns 65 and 65′ shown in FIG. 6 into the elemental fractions 62′ and 63′, respectively, shown in FIG. 7. In this manner, the original signal 60 will be reconstituted, provided a sufficient number of elemental fractions of such signal is processed.

The error signal 70, on the other hand, is dispersed by the restoration filter 36 since it is dissected as it travels along the delay line $L_{12}$ through $L_1$ and is successively branched off by the resistors $R_{13}$ through $R_1$. The dispersed error signal is shown in FIG. 7 by the spikes 72. The energy of the error signal 70 is thus diffused as desired.

While specific examples have been described and illustrated herein, various modifications within the scope and spirit of the subject invention will be apparent to, or will be within the reach of the applied knowledge and learning of those skilled in the art.

I claim:

1. Apparatus for producing a record of electric information signals, and for reproducing electric information signals from said record, comprising:

(a) input means for receiving time-varying electric information signals;

(b) a recording medium;

(c) means connected to said input means and adapted to be operatively coupled to said recording medium for converting said signals into information recordable on said recording medium and for recording information corresponding to elemental fractions of said signals on extended sections of said recording medium so that different elemental areas of the recording medium contain superimposed information corresponding to different elemental fractions of said signals;

(d) output means for reproduced electric information signals; and (e) means connected to said output means and adapted to be operatively coupled to said recording medium for reproducing from information recorded on said recording medium electric signals including elemental fractions corresponding to information recorded on extended sections of said recording medium, for applying said reproduced signals to said output means and for diffusing the energy of spurious signals of momentary duration.

2. Apparatus as claimed in claim 1, wherein (a) said recording medium is a magnetic recording tape;

(b) said means connected to said input means include means for converting said information signals into magnetically recordable information and for recording magnetically recordable information corresponding to elemental fractions of said signals on lineally extended portions of said magnetic recording tape so that elemental areas of said tape contain superimposed information corresponding to different elemental fractions of said signals; and (c) said means connected to said output means include means for reproducing from information recorded on said tape electric information signals including elemental fractions corresponding to information recorded on lineally extended portions of said tape, and electric error signals having extended time regions corresponding to spurious information of momentary duration.

3. Apparatus as claimed in claim 1, wherein said means connected to said input means include means for dispersing bits of information contained in different elemental fractions of said signals received at said input means over extended periods of time.

4. Apparatus as claimed in claim 1, wherein said means connected to said input means include filter means imposing time delays on bits of information contained in elemental fractions of said signals received at said input means.

5. Apparatus as claimed in claim 4, wherein said filter means are constructed to impose different time delays as a function of the frequency of said bits of information.

6. Apparatus as claimed in claim 5, wherein said filter means have a substantially constant amplitude versus frequency response over a predetermined bandwidth of frequencies.

7. Apparatus as claimed in claim 1, wherein said means connected to said input means include first means for dispersing bits of information contained in elemental fractions of said signals received at said input means over extended periods of time, and said means connected to said output means include second means for converting bits of information occurring over extended periods of time into bits of information forming elemental fractions of a reproduced signal, and for diffusing the energy of bits of spurious information over relatively extended periods of time.

8. Apparatus as claimed in claim 7, wherein said second means include filter means for reducing the duration of bits of information signals occurring over extended periods of time, and imposing time delays on said bits of spurious information.

9. Apparatus for reproducing time-varying electric information signals from an information record located on a recording medium and including spuriou information bits, comprising:

(a) means adapted to be operatively coupled to said recording medium for converting said information into corresponding time-varying electric information signals and said spurious information bits into corresponding spurious electric information signal bits; and (b) means connected to the first mentioned means for reducing the elemental time duration of said time-varying electric information signals and extending the time duration of said spurious information bits, whereby the energy of said spurious information bits is dispersed relative to said electric information signals.

10. Apparatus as claimed in claim 9, including means for establishing said information record, which comprise:

(a) input means for receiving time-varying information signals;

(b) means connected to said input means for converting said information signals into corresponding signals in which time points of said time-varying information signals have relatively extended time durations; and (c) means connected to said converting means and adapted to be operatively coupled to said recording medium for recording said corresponding signals on said recording medium.

References Cited

UNITED STATES PATENTS 3,207,854 9/1965 Johnson ---------- 719—100.2

BERNARD KONICK, Primary Examiner

W. F. WHITE, Assistant Examiner

U.S. Cl. X.R.

340—174.1